Nov. 20, 1951
D. H. GRIDLEY
2,575,342
POSITION SENSING DEVICE
Filed June 2, 1949
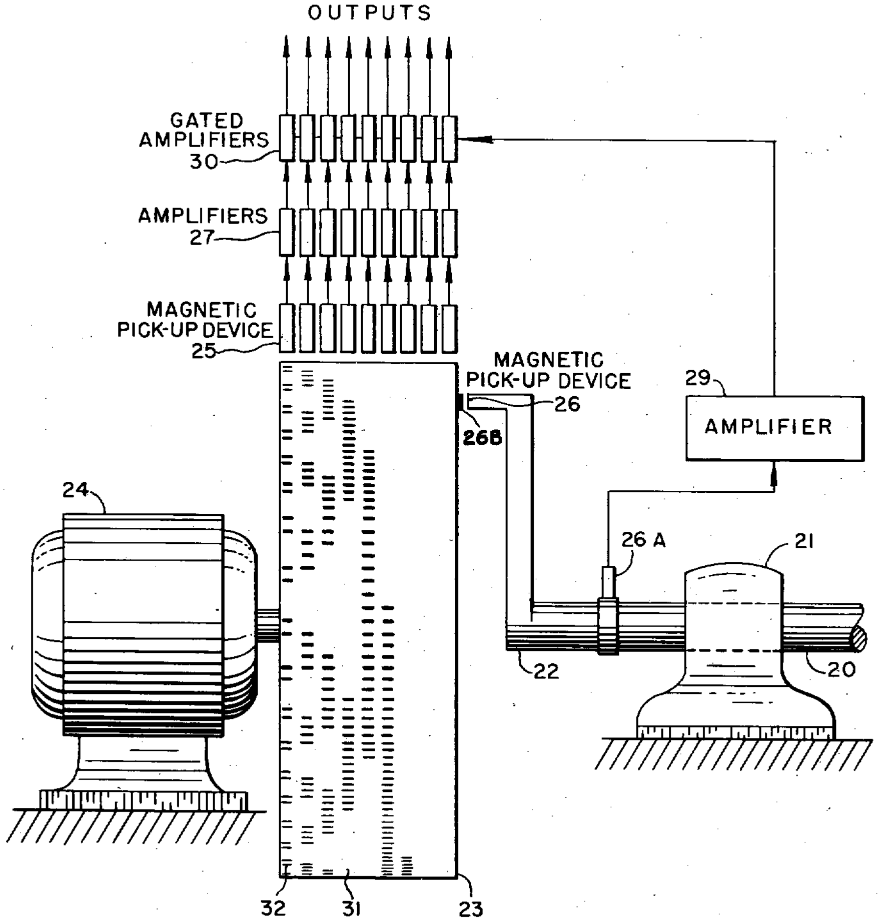
Inventor
DARRIN H. GRIDLEY
By M. C. Hayes
ATTORNEY Patented Nov. 20, 1951

2,575,342

UNITED STATES PATENT OFFICE 2,575,342

POSITION SENSING DEVICE

Darrin H. Gridley, Washington, D. C.

Application June 2, 1949, Serial No. 96,802

7 Claims. (Cl. 177—380)

(Granted under the act of March 3, 1883, as amended April 30, 1928; 370 O. G. 757)

This invention relates to position sensing devices and in particular to equipment for automatically providing information as a discrete electrical quantity relative to the position of a movable member.

In numerous measuring and computing applications information is obtained or supplied in the form of variations in the position of a movable shaft. A typical case might involve a directional movable antenna system such as would be employed in a radar system. Where the antenna position must be indicated at some remote point it generally is the practice to use a remote transmission system which might be of a type such as a selsyn or potentiometer which can provide visual indication. Such visual indication, even where it is obtained from a meter operated electrically, is not in a convenient form for automatic and rapid manipulation such as is desired in a calculating machine or for precision transmission over radio links. Many sources of error are involved and visual indication and mental translation must be employed where a shaft position reading must be made, tabulated, then converted into a form, as by punching tape, usable by calculating machines.

In many such applications of electrical information, storage and calculation equipment it is further desired to transmit information positively as a numerical quantity to control the operation of some apparatus at a distant point. Since some form of energy repeater or relay system is generally employed, suitable signal operative devices are necessary. Information is generally conveyed as numbers but the decimal system as normally used is not readily handled by electrical apparatus such as relays, electrical counters and the like. Each decimal digit requires ten conditions to represent it whereas a simple relay has only two conditions usually open or closed with no reliable in-between position. So that such two position apparatus can be simply employed it is possible to make use of a completely different system of numbers known generally as the binary system in which only two electrical conditions are needed to represent each digit of the number.

For illustration the decimal numbers 0 to 15 may be represented mathematically by the following typical binary digit combinations:

| Decimal Numbers | Cyclic Binary |
|---|---|
| 0 | 0000 |
| 1 | 1000 |
| 2 | 1100 |
| 3 | 0100 |
| 4 | 0110 |
| 5 | 1110 |
| 6 | 1010 |
| 7 | 0010 |
| 8 | 0011 |
| 9 | 1011 |
| 10 | 1111 |
| 11 | 0111 |
| 12 | 0101 |
| 13 | 1101 |
| 14 | 1001 |
| 15 | 0001 |

The cyclic binary system herein shown is not constructed in the common $2^N$ system but is somewhat arbitrary, chosen specifically to minimize reading errors when binary values on successive portions of a tabulation are scanned in succession. The same quantity of digits are required for a given maximum representation, as given by the relationship $2^N$, however. In the tabulation it is to be noted that only one binary digit changes between any two successive codes. As an example the cyclic binary representation of decimal digit 4 is obtained from the binary representation of decimal digit 3 merely by changing the third digit from 0 to 1. Thus if by accident, a scanning device of finite width were to rest simultaneously on the division between 3 and 4, it would read both and give the value for 4, or 0110. In the conventional binary $2^N$ system, decimal digit 3 ordinarily is represented by 1100 and decimal 4 by 0010. It is clear then that were both 3 and 4 to be read simultaneously as by a photoelectric scan where the binary value 1 is represented by a light transmission region and the value 0 by an opaque region, a reading of 1110 could result. This reading corresponds to the $2^N$ binary decimal equivalent of 7 which is considerably in error, being neither 3 nor 4, the nearest to the correct binary values.

As above indicated a binary digital representation of the decimal numbers from 0 to 15 inclusive requires a four place binary digit number in which each binary digit may be represented by the binary characters 0 or 1. Thus each binary digit has only two values and can be readily handled and/or indicated by ordinary relay or scale-of-two counter circuits having two conditions of stability.

As further apparent from the foregoing table the quantity of decimal numbers that can be indicated by a given quantity of binary digits varies as 2 to the "N" power where "N" represents the number of places in the binary quantity.

The way in which the cyclic binary system is built up as binary digits are added is not difficult to see once the principle is thoroughly understood. With reference to the representation for the decimal numbers 8 through 15 in the tabulation which represent the decimal numbers added by the last (fourth) binary digit adding $2^{(n-1)}$ or 8 decimal numbers it will be noted that the (1) binary condition is indicated in the first digit column (right hand) for all numbers. The letter ($n$) in the algebraic expression indicates the quantity of binary digits present.

The second digit column has the (1) binary condition for the first $2^{(n-2)}$ numbers (8 through 11) and the (0) binary condition for the latter $2^{(n-2)}$ numbers.

The third digit column has the (0) binary condition represented for the first and last $2^{(n-3)}$ numbers and the (1) binary digit for the middle $2^{(n-2)}$ numbers.

The fourth digit column has the (0) binary condition represented for the first $2^{(n-4)}$ numbers with opposite binary conditions prevailing for alternate succeeding groups of $2^{(n-3)}$ numbers and the (0) binary condition again represented at the last $2^{(n-4)}$ numbers.

If five binary digits are employed the value of the digits in the fourth column will also follow the pattern just given, and the value of the fifth digit will be given in the fifth column in a similar manner with the value (0) for the first $2^{(n-5)}$ numbers and opposite binary conditions prevailing for alternate succeeding groups of $2^{(n-4)}$ numbers and the (0) binary condition again represented at the last $2^{(n-5)}$ numbers.

Such digital values are indicated on drum 23 of the figure with binary values including the numbers through six binary digits.

It is an object of this invention to provide information conveying apparatus which will derive binary digital information relative to the position of a rotatable shaft.

Another object of the present invention is to provide position sensing apparatus which will provide output signals in binary digital forms.

Other and further objects and features of the present invention will become apparent upon a careful consideration of the accompanying detailed description and drawing of which the single figure shows a typical embodiment of the invention.

Briefly, the apparatus provided by the present invention for determining the angular position of a rotatable shaft includes a calibrated reference shaft or reference member which is disposed adjacent the rotatable shaft whose position it is desired to know and rotated with respect thereto. The calibrations contained in the reference shaft are preferably in the form of a plurality of juxtaposed peripheral signal tracks each of which contains a plurality of signals recorded thereon and arranged so that collectively and at any one angular point on the periphery of such shaft the combined signals appearing at this angle on the several tracks make up a binary code which is representative of the angle between such point and a reference point on the shaft. Operatively engaging each signal track is a separate signal pick-up device and amplifier channel. Also recorded on the reference shaft at the reference point is a single signal pulse which engages a separate pick-up device attached to and rotated with the rotatable shaft whose position it is desired to know.

In operation when the pick-up device attached to the rotatable shaft encounters the reference point signal an electrical impulse is induced in this pick-up. This signal is then used to unblock the several gated amplifier channels fed by the pick-up device which engage the peripheral signal track. The output from the several channels at this instant is in binary form and is representative of the instantaneous angular position of rotatable shaft.

In the description which follows and in the drawing applicant, for purposes of clarity, has disclosed the use of magnetic pick-up and signal tracks and it will be understood that other equivalent systems may be employed. For example the pick-up devices could be crystals and the signal tracks could be permanently etched in the surface of the drum.

With particular reference now to the figure, a basic mechanical embodiment of the features of the present invention is shown in which the rotatable shaft whose position must be determined is represented by shaft 20. Shaft 20 is subject to rotational variation and might, for example, be an antenna shaft. A suitable bearing or shaft support is indicated by numeral 21. Near one end 22 of shaft 20 is placed a cylindrical reference member 23 which is made of or coated with magnetizable material. Reference member 23 is provided with rotational motion of a fixed speed by a motor 24. Rotation of reference member 23 is preferably fast relative to shaft 20. In some cases but not necessarily it may be desirable that motor 24 provide constant anglular velocity rotation and for that purpose it is preferable that it be of a polyphase synchronous type having a large amount of inertia.

Placed near cylindrical member 23 and in operative communication with the periphery thereof is a first signal pick-up device 25 which is held in a fixed position. Pick-up device 25 actually contains a plurality of adjacent magnetic pick-up heads which operate independently and are placed in a line which may be parallel to the axis of rotation of cylindrical member 23. A second signal pick-up device 26 is attached to the end of shaft 20 and is caused to rotate with shaft 20. Suitable sliding contacts for electrical connections to device 26 are provided on shaft 20 and indicated generally by numerals 26-A.

Recorded or otherwise deposited on drum 23 are a plurality of signal tracks 31 in which the signals carried by each track are placed on member 23 in a very definite known relationship one to the other. For illustration the straight cyclic digital system of signal recording has been selected and to give a typical accuracy of one degree, a total of 360 positions or readily identifiable markings are required on member 23. To represent 360 positions in this straight fashion, a total of nine binary digits is required and as previously stated, a separate peripheral track typified at 31 and pick-up head 25 is required for each. Thus the pick-up device 25 contains nine heads shown side by side in the figure each cooperatively communicative with a different one of the binary digital signal tracks. Under each head, during rotation of the member 23, passes a separate signal track 31 which can have a short duration signal recorded therein in one sense for one binary condition (1) and in the opposite sense for the other binary condition (0). These signal tracks are shown in typical configuration by the marks 32 on member 23 in the figure. Marks 32 represent the binary character (1) for example while the spaces in between represent the other (0).

Magnetic pick-up device 26 is so placed in the figure that it is adjacent to the side of member 23. Such a placement is not essential however in certain situations it is convenient. In the circular portion of member 23 that moves under device 26 is placed just a single recorded spot indicated at 26B so that device 26 will produce only one output signal for each relative revolution of member 23 with respect to device 26. The single signal 26B in the track for device 26 is placed in a known relationship with respect to the binary coding in the peripheral tracks of member 23.

With the fixed position device 25 mounted as shown a typical reference position for device 26 could be "up" or at the zenith of its path. In this position a typical binary coding in the portion of each of the nine tracks under device 25 could be plus–plus–plus–plus–plus–plus–plus–plus–plus or which corresponds to the binary quantity 000000000 to indicate the zero degree condition. In binary progression then one degree would be indicated when the device 26 is one degree off the zenith in a selected direction which may be clockwise viewed from the end adjacent shaft 20 and would be represented digitally by the binary quantity 100,000,000 meaning that in the first track of the line a signal of selected polarity would be recorded.

Originally, then, the member 23 will be provided with peripheral signals recorded with the zero binary position in register with the reference signal 26B recorded in the track for device 26 and then, in a counter-clockwise direction around the drum as viewed from the end near shaft 20, additional binary combinations relative to other shaft positions. The marks in the lines indicate the binary conditions beginning typically with the notation for 1 degree at the top, 2 degrees immediately below it, 3 below that and so on.

It is entirely possible to employ the devices 25 and 26 as recording devices instead of pick-up devices for the placement of the signals on the surface of member 23 if such devices are so designed and provided with "record" signals from suitable sources which could be the amplifiers 27 operating in reverse.

With signals thus placed on member 23 in positional alignment with the pick-up devices 25, 26, rotation of member 23 with respect to the devices will induce signals in them. The signal induced in device 26 is amplified by amplifier 29 and employed to control the amplified output from device 25. Signals from the pick-up devices 25 are separately amplified by multiple units indicated by the adjacent blocks at numeral 27 and separately supplied to separate, normally blocked, amplifiers indicated by the adjacent blocks of numeral 30. Gated amplifiers 30 may comprise simply electron tubes in heavily biased circuits which will not amplify signals from amplifiers 27 except during the time that an output signal derived by device 26 and amplified by 29 is supplied thereto. Thus, each time the short duration signal 26B placed upon the recording track cooperative with device 26 passes device 26, gated amplifiers 30 will be rendered transmissive to deliver as separate output signals, the binary signals present at that instant in register with each pick-up unit of the device 25.

Binary signals regarding shaft position are thus easily and accurately obtained for use by automatic tabulating or calculating equipment.

From the foregoing discussion it is apparent that considerable modification of the features of the present invention is possible without exceeding the scope thereof as defined in the appended claims.

The invention described herein may be manufactured and used by or for the Government of the United States of America for governmental purposes without the payment of any royalties thereon or therefor.

What is claimed is:

1. A sensing apparatus for determining the position of a rotatable shaft comprising, a reference member containing a plurality of predeterminedly arranged signal tracks, means rotating said reference member in proximity to the rotatable shaft, first signal pick-up means affixed to the rotatable shaft at a point providing positional variation thereof with shaft rotation cooperative with at least one of the signal tracks contained on the reference means to produce a gating signal each time a selected point of the reference means is in register therewith, second signal pick-up means bearing a fixed position in proximity to the reference means continually deriving various identifying signals from the remaining signal tracks therefrom in dependency on the position thereof, and gated amplifier means delivering said identifying signals only when a gating signal is produced by the first signal pick-up means.

2. A sensing apparatus for determining the position of a rotatable shaft comprising, first calibration means containing stored shaft position signals, second calibration means containing a stored reference signal, driver means moving the first and second calibration means in proximity to the shaft, first signal pick-up means attached to the shaft displaced respective to the axis thereof and cooperative with the second calibration means producing gating signals, second signal pick-up means placed in fixed position cooperative with the first calibration means to produce secondary signals, and gated amplifier means responsive to the gating signals delivering position information in dependency on the secondary signals derived from the first calibration means whenever a reference signal is derived from the second calibration means.

3. A position sensing apparatus for determining the instantaneous position of a rotatable shaft comprising, a reference member containing information in a plurality of separate continuous signal tracks part of which have position information in binary code combinations, a first signal pick-up device attached to the shaft cooperative with one of the above signal tracks to produce a gating reference signal when a reference portion of the tracks is in register therewith, secondary signal pick-up devices possessing a fixed position cooperative with the signal tracks containing the aforementioned binary code combinations to produce binary coded gating position signals therefrom, and a gated amplifier system responsive to the gating reference signal and the gating position signals to produce binary coded shaft position output signals each time a gating reference signal occurs.

4. A position sensing device for determining the position of a rotatable member, comprising a calibrated reference shaft disposed adjacent said rotatable shaft and rotatable with respect thereto, said calibrated member being divided into equal angular intervals with each interval being designated by a characterizing plurally coded signal appropriately deposited on the periphery of the member to thereby form a calibrating signal track, pick-up means fixedly associated with said calibrated member in operative communication with the coded signal track and gating means cyclically rendering said pick-up means operative to produce a coded output signal corresponding to the signal induced therein by said signal track whenever said calibrated member and said rotatable shaft assume a predetermined angular relationship.

5. A position sensing device for determining the position of a rotatable shaft comprising, a rotatable reference member angularly calibrated with a plurality coded signal tracks formed thereon, a plurality of signal pick-up means located at a reference position in operative communication with said signal tracks, and control means connected to the rotatable shaft for rendering said pick-up means periodically simultaneously operative whenever said reference member and said rotatable shaft assume a predetermined angular relationship.

6. A position sensing device for determining the position of a rotatable shaft comprising, a rotatable reference member angularly calibrated with a coded signal track, signal pick-up means located at a fixed position in operative communication with said signal track, a first reference point on said shaft, a second reference point on said reference member registerable with said first reference point by rotation of said reference member, means for rotating the reference member independently of the shaft, and means responsive to the registration of said reference points to periodically at rotation frequency transmit the positional information from the signal pick-up means.

7. A position sensing device for determining the position of a movable member, comprising, a movable reference member calibrated with a coded signal track, signal pick-up means located at a fixed position in operative communication with said signal track, means for moving the reference member independently of the movable member in repetitive motion relative thereto, a first reference point on said movable member, a second reference point on said reference member registerable with said first reference point during the repetitive motion of said reference member, and means responsive to the registration of said reference points to periodically at repetitive frequency transmit the position information from the signal pick-up means.

DARRIN H. GRIDLEY.

REFERENCES CITED

The following references are of record in the file of this patent:

UNITED STATES PATENTS

| Number | Name | Date |
|---|---|---|
| 1,913,511 | Reynolds | June 13, 1933 |
| 1,972,289 | Chauveau | Sept. 4, 1934 |
| 2,082,697 | Ingerson | June 1, 1937 |
| 2,089,441 | Smith | Aug. 10, 1937 |

FOREIGN PATENTS

| Number | Country | Date |
|---|---|---|
| 470,008 | Great Britain | Aug. 6, 1937 |